(12) United States Patent
Phillips (10) Patent No.: US 6,961,908 B2
(45) Date of Patent: Nov. 1, 2005

(54) SYSTEM AND METHOD FOR NAVIGATING GRAPHICAL IMAGES

(75) Inventor: Brent Russel Phillips, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 657 days.

(21) Appl. No.: 10/004,923

(22) Filed: Dec. 5, 2001

(65) Prior Publication Data
US 2004/0205504 A1    Oct. 14, 2004

(51) Int. Cl.⁷ .................................... G06F 13/00
(52) U.S. Cl. ........................ 715/839; 715/835
(58) Field of Search ................ 715/765, 790, 715/788, 791, 839, 835, 840, 804

(56) References Cited
U.S. PATENT DOCUMENTS

| | | | |
|---|---|---|---|
| 5,761,655 A | 6/1998 | Hoffman | |
| 5,909,241 A * | 6/1999 | Hibino et al. | 348/97 |
| 5,917,488 A | 6/1999 | Anderson et al. | |
| 6,058,417 A | 5/2000 | Hess et al. | |
| 6,275,829 B1 | 8/2001 | Angiulo et al. | |
| 6,674,472 B1 * | 1/2004 | Tsutsui | 348/333.05 |
| 6,724,403 B1 * | 4/2004 | Santoro et al. | 715/765 |

* cited by examiner

*Primary Examiner*—Cao (Kevin) Nguyen
(74) *Attorney, Agent, or Firm*—VanLeeuwen & VanLeeuwen; Joseph T. VanLeeuwen; David A. Mims, Jr.

(57) ABSTRACT

A system and method for navigating graphical images is presented. A display shows a matrix of thumbnail images currently with a larger master image. A user selects a thumbnail image and a corresponding larger image is displayed in the master image. The user may scroll through thumbnail images left and right, or up and down. The master image viewing is retained during the thumbnail scrolling. The user may change the resolution of the thumbnail images and master image. The user may also change the thumbnail matrix configuration or select an auto configuration mode.

17 Claims, 7 Drawing Sheets

Master Image
260
(After user selects thumbnail 9 from Figure 2B)

SYSTEM AND METHOD FOR NAVIGATING GRAPHICAL IMAGES

BACKGROUND OF THE INVENTION

1. Technical Field

The present invention relates in general to a system and method for navigating through graphical images. More particularly, the present invention relates to a system and method for scrolling through thumbnail images while maintaining a view of a larger master image.

2. Description of the Related Art

Graphical navigation is increasing in popularity due to increased Internet connection speeds and increased processing ability of personal computers. Users retrieve many types of graphical images for viewing from the Internet, such and digital images and video clips and store them on personal computers.

A business web page or a user's personal file may include many graphical images. Thumbnail images are used in navigation applications in order to display many images concurrently. Thumbnail is a term used by graphic designers and photographers for a small image representation of a larger image, usually intended to make it easier and faster to look at or manage a group of larger images. For example, software that provides management of a multiple images often provides a miniaturized version of each image for use as a thumbnail.

Web sites with many pictures, such as online stores with visual catalogs, often provide thumbnail images instead of larger images to make the page download faster. The user controls which images to view in full size. A user can view the thumbnails and decide to download and display a larger image of any of the thumbnails by selecting the desired thumbnail image(s).

Thumbnails may also be a cropped to show interesting portion of a larger image, rather than simply reducing the entire image. Depending upon the subject matter and size of the thumbnail, cropping an image to show an interesting portion may be an effective sales tool.

A challenge found with existing navigation applications is that navigation applications do not retain the view of the non-selected thumbnail images when the larger, selected image is displayed. Navigation applications may cover up the non-selected thumbnail images with a new window that includes a larger image of the selected thumbnail image. Or, navigation applications may display a larger image of the selected thumbnail image using the same navigation window in which case the user selects the "Back" button on the navigation application to return to the non-selected thumbnails. What is needed, therefore, is a way to view a larger selected thumbnail image while effectively retaining the view of the non-selected thumbnail images.

SUMMARY

It has been discovered that a screen display is effectively managed by having scrollable thumbnail images in one section of a display window and a larger, non-overlapping master image in different section of the same display window.

A user loads an initial display that includes a thumbnail table matrix and a larger, master image. The thumbnail table matrix shows many thumbnail images. The user may select different matrix sizes, such as a three by three matrix or a three by four matrix. An appropriate size of the thumbnail table matrix may depend on the size of the monitor and the resolution capability.

When a user selects a thumbnail image to view, a corresponding larger view of the image is displayed in the larger master image. If the thumbnail image is a cropped section of the complete image, the complete image will appear in the master image area.

The thumbnail table matrix has corresponding "Next" and "Back" buttons. The "Next" and "Back" buttons allow the user to scroll through thumbnail images while maintaining the view of the master image. The "Next" and "Back" buttons may be configured either in a horizontal mode or a vertical mode. In horizontal mode, selecting the "Next" button scrolls the thumbnails to the left and new thumbnails appear on the right column. The "Back" button scrolls the thumbnails to the right and new thumbnails appear on the left column. In vertical mode, selecting the "Next" button scrolls the thumbnails up and new thumbnails appear on the bottom row. The "Back" button scrolls the thumbnails down and new thumbnails appear on the top row.

The user has various configuration settings. The user may change the resolution of the thumbnail images or master image. For example, the user may have an older monitor and high-resolution thumbnails and master image may take up too much display area. The user may also configure the system for "auto" mode and allow the system to determine the most appropriate resolution and thumbnail table matrix size.

In one embodiment, this invention may be used for video conferencing. In this embodiment, the thumbnails include a live video feed of each person attending the video conference, and the master image may be the person who is speaking or a feed selected by the user. In addition, as different individuals speak, the master image may change to display the corresponding video feed.

In another embodiment, this invention is used for viewing a training video. In this embodiment, each thumbnail includes a representation of a certain topic. The user selects the thumbnail topic of interest and the video topic selected is displayed in the master image. When the user is finished with the first topic, the user may select a different topic by selecting a new thumbnail instead of scanning through the entire training video.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
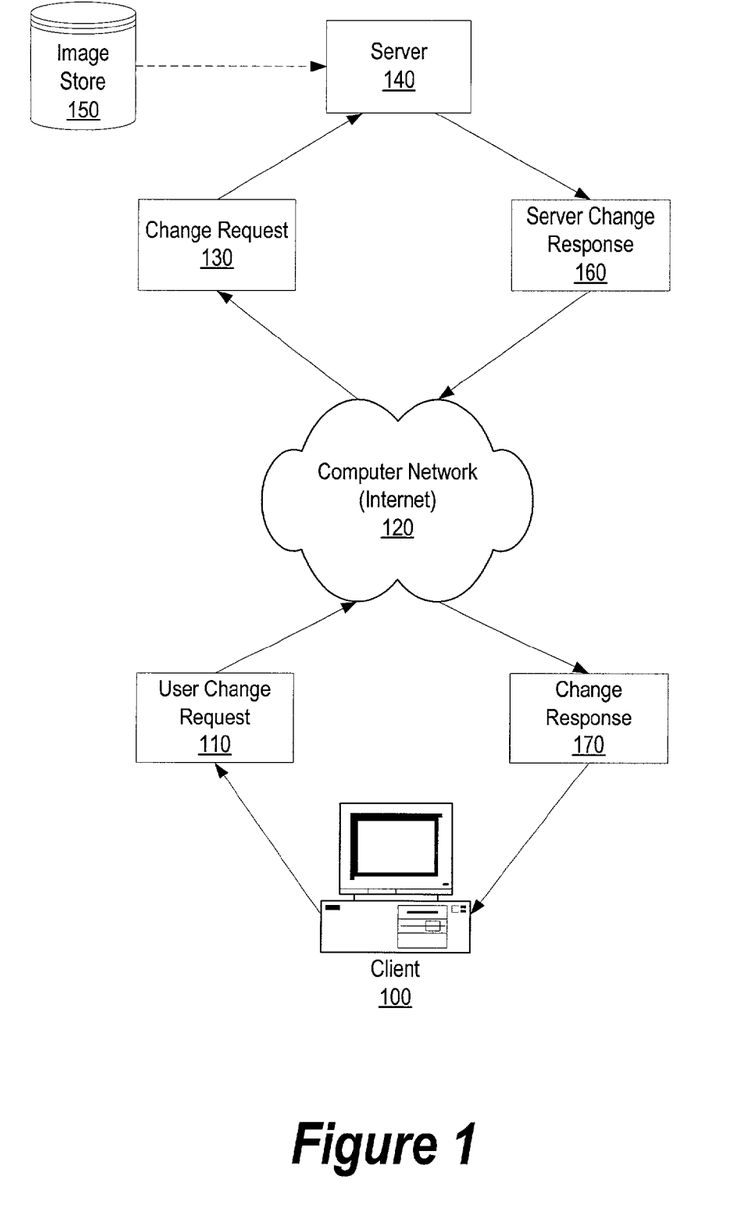
FIG. 1 is a diagram of a client accessing graphical images from a server.

FIG. 1 is a diagram of a client accessing graphical images from a server. Client 100 accesses image store 150 information from server 140 through computer network 120. Computer network 120 may be any network, such as the Internet, that allows computers to communicate with one another. Image store 150 may be a non-volatile storage area, such as a computer hard drive, and may include data such as images, video clips, or other multimedia information.

Client 100 loads thumbnail images and sends user change request 110 to computer network 120. User change request 110 may be a request to retrieve more images or may be a request to change configurations. Computer network 120 sends change request 130 to server 140 for processing. Server 140 retrieves the data, such as image files, corresponding to the request from image store 150 and sends server change response 160 to computer network 120. Computer network sends change response 170 to client 100 for processing.

Client 100 may initially access data information from image store 150 and store the data on an internal local storage area. In another embodiment, client 100 may have data loaded directly on a local storage area. In this embodiment, client 100 may access its' internal storage area for new thumbnail images and configuration changes.

Figure 2A:
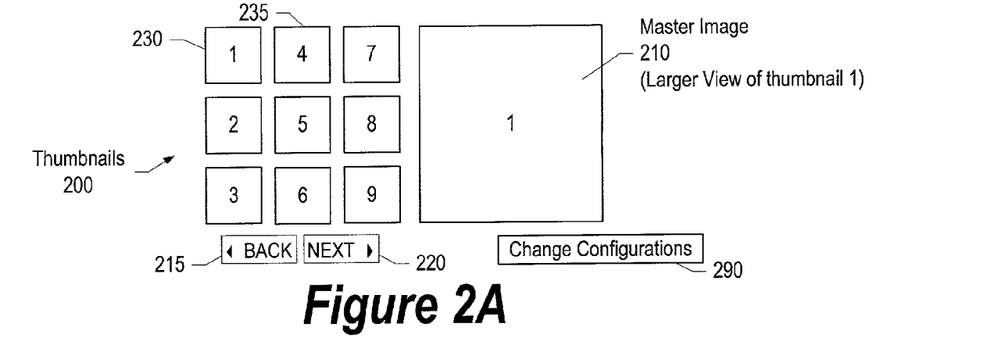
FIGS. 2A, B, and C are changing displays of thumbnails and master images during button selections.
Figure 2B:
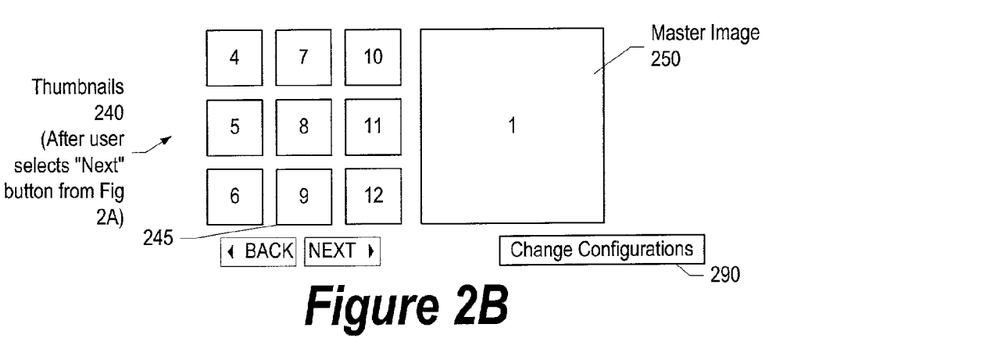
Figure 2C:
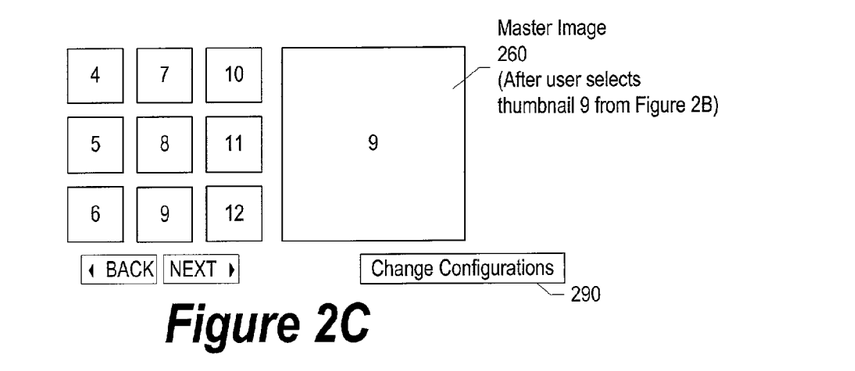

FIGS. 2A, B, and C are changing displays of thumbnails and master images during button selections. FIG. 2A shows a display that includes master image 210, thumbnails 200, "back" button 215, "next" button 220, and configuration change button 290. Master image 210 shows a larger version of thumbnail 1 230. Any thumbnail in thumbnails 200 may be selected to display a larger version of the corresponding thumbnail in master image 210. For example, if a user selects thumbnail 4 235, a larger version of thumbnail 4 235 is displayed in master image 210.

The user selects "back" button 215 or "next" button 220 to change displayed thumbnail images. The current configuration of FIG. 2A allows the user to scroll left or right to view different thumbnail images. In another embodiment, back button 215 and next button 220 may be used to scroll vertically up and down to view different thumbnail images. Configuration change button 290 allows the user to enter a configuration menu to change scroll modes among other configuration changes (see FIG. 6 for an example configuration change screen).

FIG. 2B shows a resulting display when a user selects "next" button 220 from FIG. 2A. The rows in thumbnails 240 are shifted left. The first row is removed and a new row is displayed on the right. Master image 250 is not changed since the user has not selected a new thumbnail. FIG. 2C shows a resulting display when a user selects thumbnail 9 245 from FIG. 2B. Master image 250 is refreshed and a larger version of thumbnail 9 245 is displayed in master image 260. FIGS. 2A, 2B, and 2C display a three by three matrix of thumbnails. In another embodiment, the matrix may be a different configuration, such as a three by four matrix.

Figure 3:
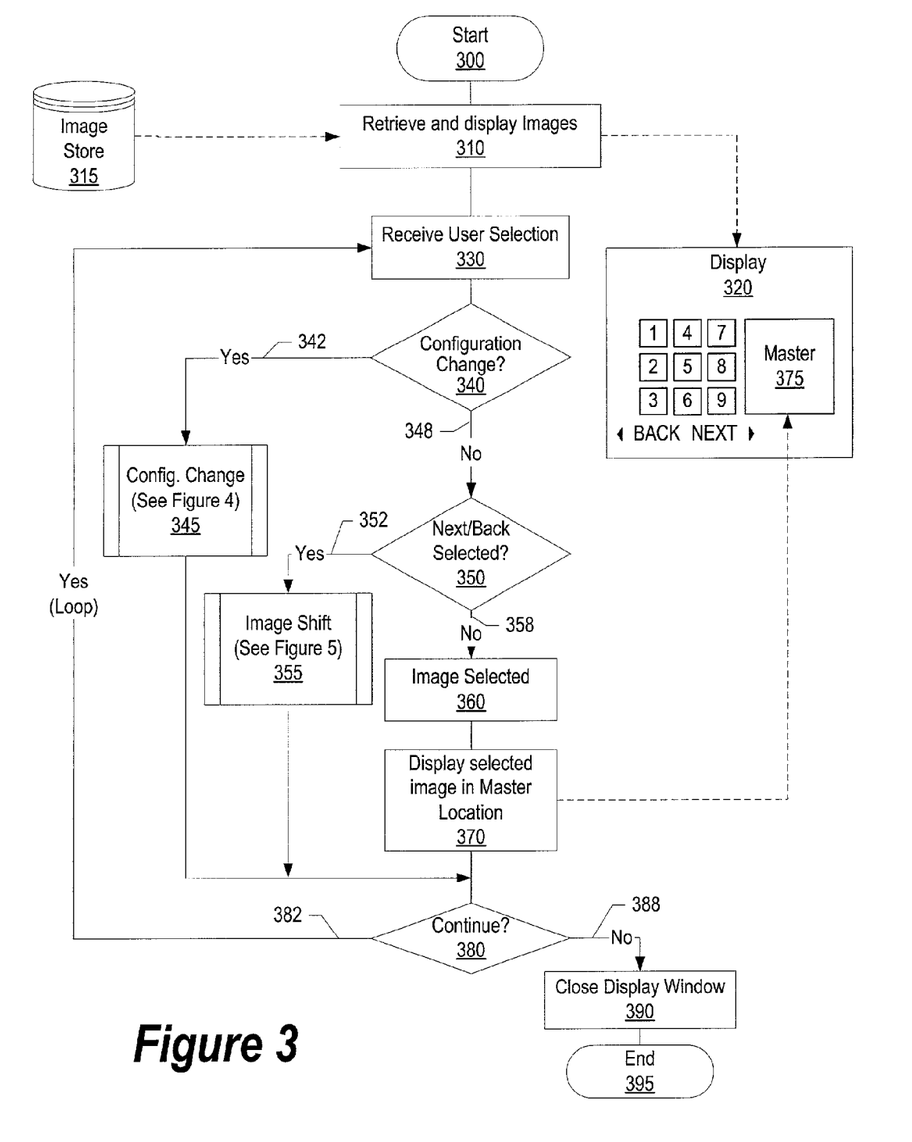
FIG. 3 is a high-level flowchart showing display changes from user selections.

FIG. 3 is a high-level flowchart showing display changes from user selections. Processing commences at 300 whereupon images are retrieved from image store 315 and displayed on display 320 (step 310). Image store 315 may be a local non-volatile storage area, such as a computer hard drive, or may be a remote storage location in server accessible through a computer network.

A user makes a selection at step 330 and a determination is made as to whether the selection is to change the configuration of the display (decision 340). If the user requested a configuration change, decision 340 branches to "Yes" branch 342 whereupon the configuration change is processed (pre-defined process block 345, see FIG. 4 for further details). On the other hand, if the selection is not a configuration change, decision 340 branches to "No" branch 348.

A determination is made as to whether the user selected the "Next" or "Back" button (See buttons 215 and 220 in FIG. 2 for an example) to scroll thumbnail images (decision 350). If the user selected the Next or Back button, decision 350 branches to "Yes" branch 352 whereupon the Next or Back button selection is processed (pre-defined process block 355, see FIG. 5 for further details). On the other hand, if the Next or Back button is not selected, decision 350 branches to "No" branch 358 whereupon the image corresponding to the selected thumbnail image is retrieved (step 360). The retrieved image is displayed in master image 375 at step 370.

A determination is made as to whether processing continues (decision 380). If processing continues, decision 380 branches to "Yes" branch 382 which loops back to process the next user selection. This looping continues until processing terminates, at which point decision 380 branches to "No" branch 388. The display window is closed at step 390, and processing ends at 395.

Figure 4:
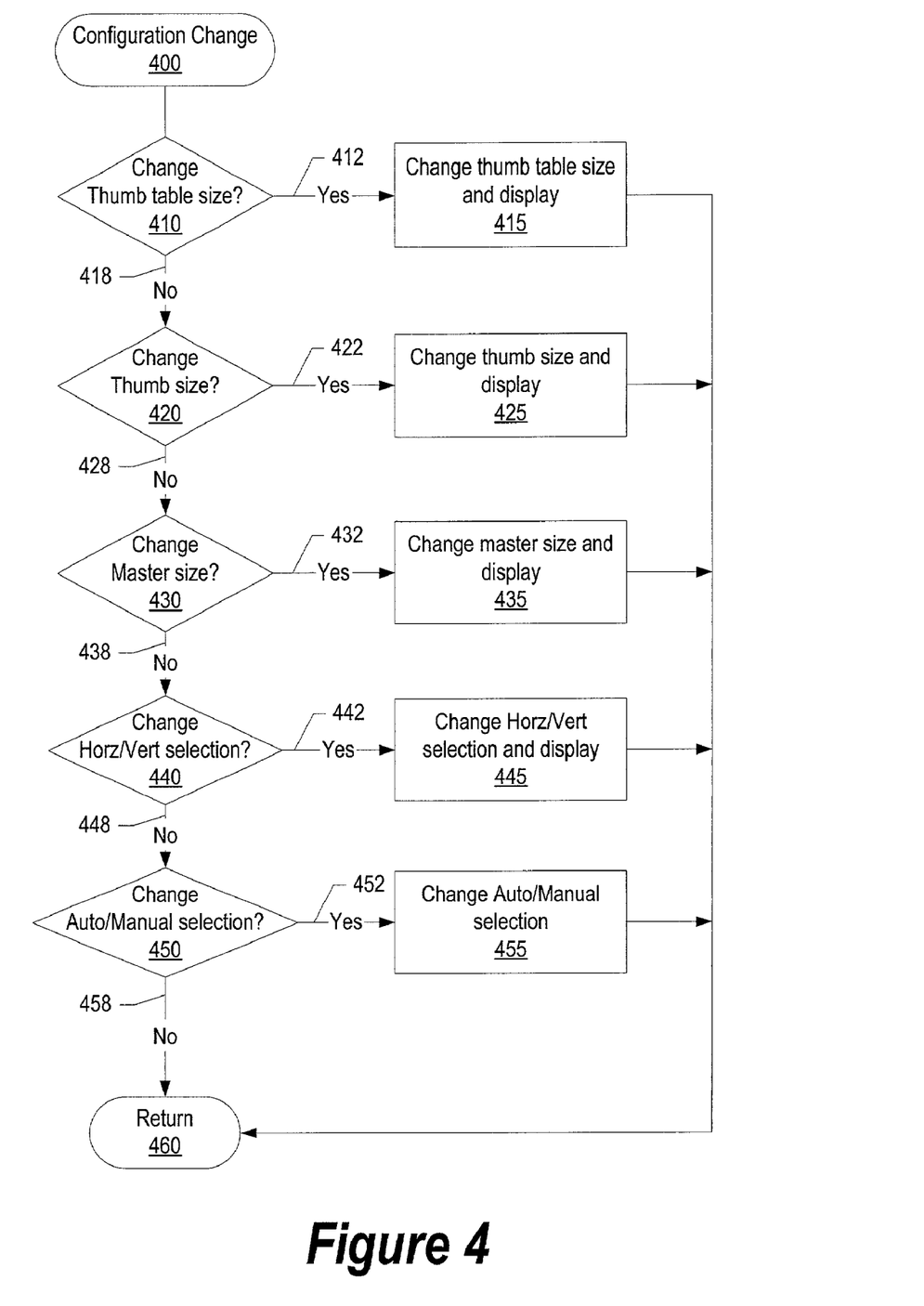
FIG. 4 is a flowchart showing configurations changing.
Figure 6:
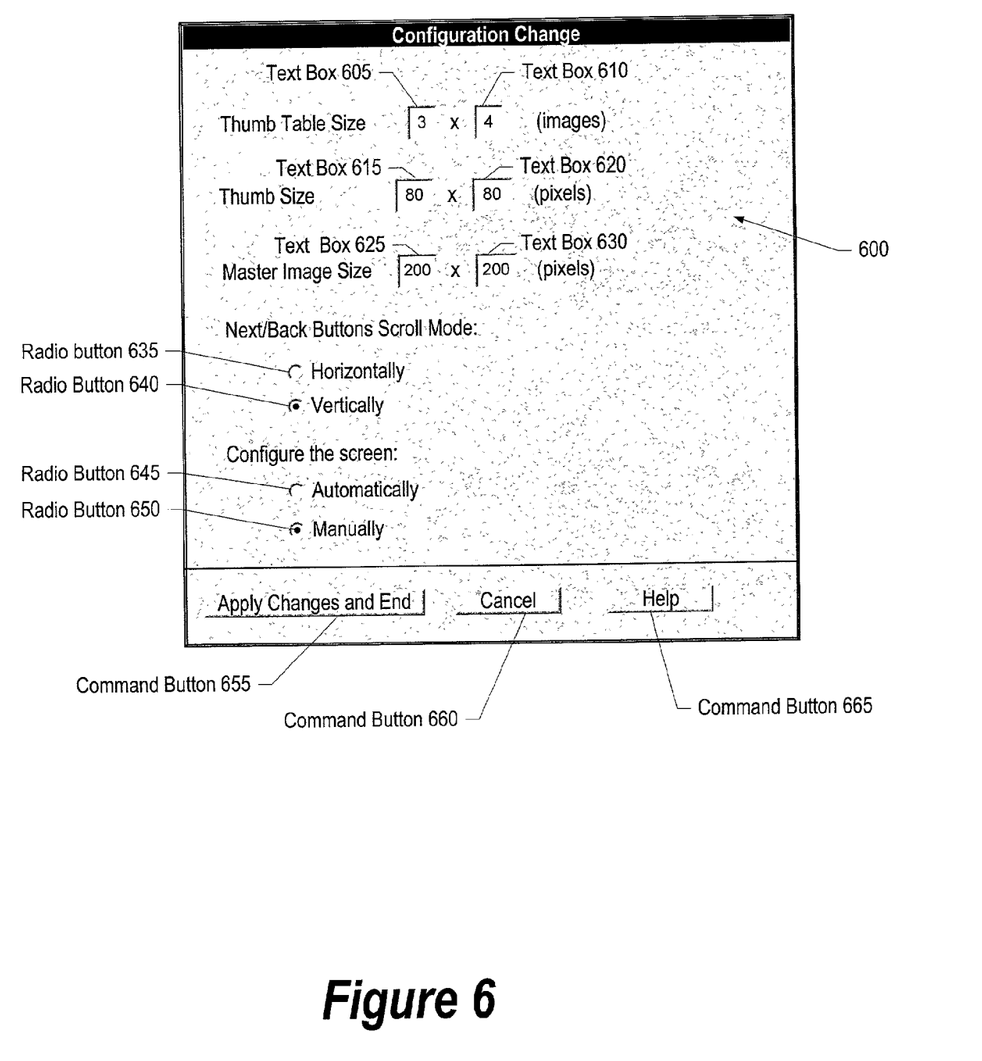
FIG. 6 is an example of a configuration change window.

FIG. 4 is a flowchart showing configuration changes (See FIG. 6 for an example configuration change screen). Configuration change processing commences at 400, whereupon a determination is made as to whether the user wants to change the thumbtable size (decision 410). For example, the user may want to change the thumbtable size from a three by three matrix to a three by four matrix in order to view more thumbnails at once. If the user wants to change the thumbtable size, decision 410 branches to "Yes" branch 412 and the thumbtable size is updated per the user selection (step 415) and processing returns at 460

On the other hand, if the user does select the thumbtable size, decision 410 branches to "No" branch 418 whereupon a decision is made as to whether the user wants to change the resolution of the thumbnails (decision 420). For example, the user may have a monitor with lower resolution and thus may wish to have lower resolution thumbnails displayed whereas a user using a high resolution monitor may wish to increase the thumbnail resolution in order to see more thumbnail detail.

If the user wants to change the thumbnail size, decision 420 branches to "Yes" branch 422 whereupon the thumbnail size is changed per the user selection (step 425) and processing returns at 460. On the other hand, if the user does not select the thumbnail size, decision 420 branches to "No" branch 428 whereupon a determination is made as to whether the user wants to change the resolution of the master image (decision 430). Using the example above, the user may have a low resolution monitor and the master image may be taking up too much screen area. Decreasing the master image resolution may free up room for other items, such as a larger thumbtable matrix size.

If the user wants to change the resolution of the master image, decision 430 branches to "Yes" branch 432 whereupon the master image resolution is changed per the user's request (step 435) and processing returns at 460. On the other hand, if the user does not want to change the master image resolution, decision 430 branches to "No" branch and a determination is made as to whether the user wants to change the scrolling method (decision 440). The user may want to have the thumbnails scroll from top to bottom (vertically) instead of from left to right (horizontally) when the Back and Next buttons are selected.

If the user wants to change the scrolling method, decision 440 branches to "Yes" branch 442 whereupon the scrolling method is changed corresponding to the user's selection (step 445) and processing returns at 460. On the other hand, if the user does not want to change the scrolling method, decision 440 branches to "No" branch 448 whereupon a determination is made as to whether the user wants to manually change configuration settings or have processing determine the most appropriate configuration settings based on system resources and automatically configure the display (decision 450).

If the user wants to change the auto/manual selection, decision 450 branches to "Yes" branch 452 whereupon the auto/manual mode is changed corresponding to the user selection and processing returns at 460. On the other hand, if the user does not want to change the auto/manual mode, decision 450 branches to "No" branch 458 and processing returns at 460.

Figure 5:
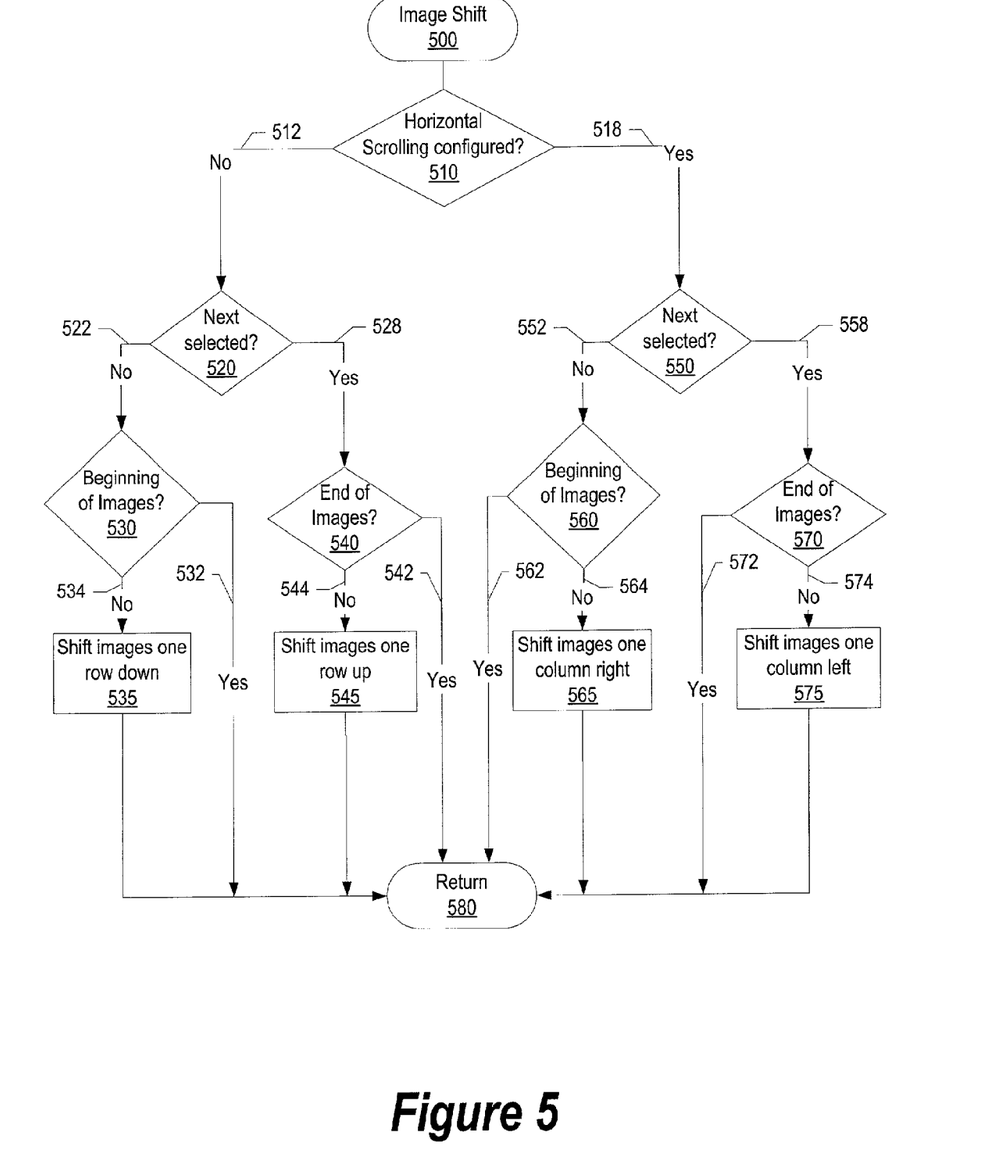
FIG. 5 is a flowchart showing images shifting in response to the "next" and "back" button selections.

FIG. 5 is a flowchart showing images shifting in response to the "next" and "back" button selections. Image shift processing commences at 500, whereupon a determination is made as to whether the system is in horizontal scrolling mode or vertical scrolling mode (decision 510). If horizontal scrolling mode is configured, decision 510 branches to "Yes" branch 518 and the Next/Back button selections are processed in a horizontal scrolling method. On the other hand, if vertical scrolling is configured, decision 510 branches to "No" branch 512 and the Next/Back button selections are processed in a vertical scrolling method.

If vertical scrolling is configured, a determination is made as to whether the Next button or Back button is selected (decision 520). If the next button is selected, decision 520 branches to "Yes" branch 528 whereupon a determination is made as to whether the end of the thumbnail images are already displayed. If the end of the thumbnail images are already displayed, decision 540 branches to "Yes" branch 542 and the thumbnails are not shifted and processing returns at 580. On the other hand, if the end of thumbnails are not already displayed, decision 540 branches to "No" branch 544 and the displayed thumbnails are shifted one row up (step 545). For example, the bottom row moves to the second to bottom row, and newly displayed thumbnails encompass the bottom row and processing returns at 580.

If vertical scrolling is configured and the Back button is selected, decision 520 branches to "No" branch 522 and a determination is made as to whether the beginning of the thumbnails are already displayed (decision 530). If the beginning of the thumbnails are already displayed, decision 530 branches to "Yes" branch 532 and the thumbnails are not shifted and processing returns at 580. On the other hand, if the beginning of the thumbnails are not already displayed, decision 530 branches to "No" branch 534 whereupon the displayed thumbnails are shifted one row down (step 535).

For example, the top row moves to the second to top row, and new thumbnails encompass the top row and processing returns at 580.

If horizontal scrolling is configured, a determination is made as to whether the Next button or Back button is selected at decision 550. If the next button is selected, decision 550 branches to "Yes" branch 558 whereupon a determination is made as to whether the end of the thumbnail images are already displayed. If the end of the thumbnail images are already displayed, decision 570 branches to "Yes" branch 572 and the thumbnails are not shifted and processing returns at 580. On the other hand, if the end of thumbnails are not already displayed, decision 570 branches to "No" branch 574 and the displayed thumbnails are shifted one column left (step 575). For example, the right column moves to the second to right column, and newly displayed thumbnails encompass the right column and processing returns at 580.

If horizontal scrolling is configured and the Back button is selected, decision 550 branches to "No" branch 552 and a determination is made as to whether the beginning of the thumbnails are already displayed (decision 560). If the beginning of the thumbnails are already displayed, decision 560 branches to "Yes" branch 562 and the thumbnails are not shifted and processing returns at 580. On the other hand, if the beginning of the thumbnails are not already displayed, decision 560 branches to "No" branch 564 whereupon the displayed thumbnails are shifted one column right (step 565). For example, the left column moves to the second to left column, and new displayed thumbnails encompass the left column.

FIG. 6 shows a configuration change window. Configuration change window 600 includes selections for a user to configure a navigation screen. The user may change the thumbtable matrix size by entering a matrix size configuration in text box 605 and text box 610. For example, the user may have a large, high resolution monitor and may enter an "8" in text box 605 and text box 610 to display an eight by eight thumbtable matrix.

A user may change the resolution of the thumbnails by entering the pixel resolution in text box 615 and text box 620. The user may also change the resolution of the master image by entering the pixel resolution in text box 625 and text box 630. The user may decide to change the resolution of the thumbnails and the master image depending upon the size and resolution of his monitor.

Horizontal or vertical scroll mode may be chosen. Selecting radio button 635 chooses horizontal scroll mode which enables the thumbtable matrix to scroll left and right when the "Back" and "Next" buttons are selected. Selecting radio button 640 chooses vertical scroll mode which enables the thumbtable matrix to scroll up and down when the "Back" and "Next" buttons are selected.

The user may decide to have the computer system determine the most appropriate configuration by selecting radio button 645. Selecting radio button 645 configures the computer system to automatically configure the thumb table size, the thumbnail resolution, and the master image resolution. The user may still have the ability to select scroll mode in automatic configuration.

After configuration selection, the user selects command button 655 to apply the selected changes and close configuration change window 600. The user may select command button 660 to cancel his configuration changes and close configuration change window 600. If the user needs help with the contents of configuration change window 600, the user selects command button 665 to access a configuration change help menu.

Figure 7:
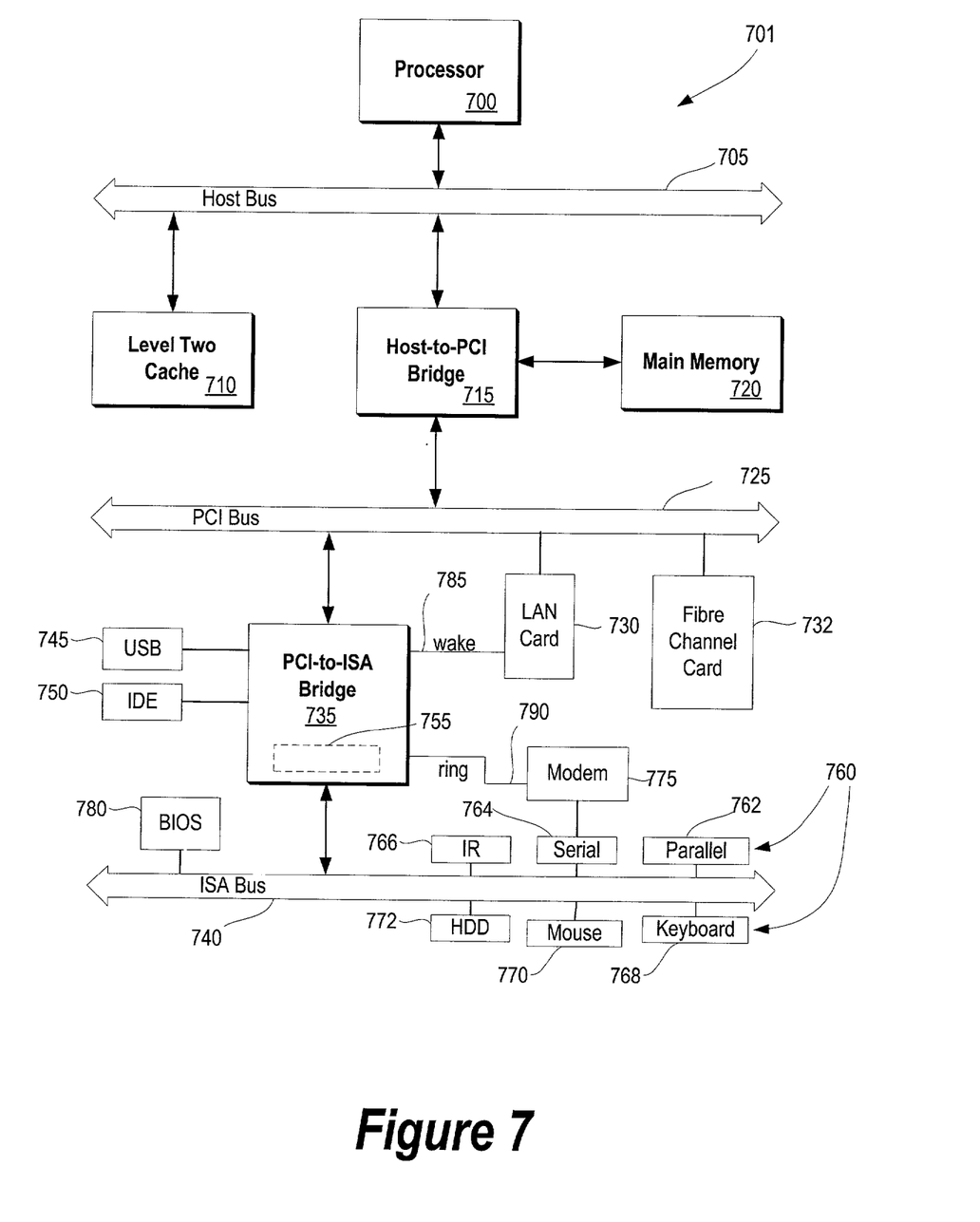
FIG. 7 is a block diagram of an information handling system capable of implementing the present invention.

FIG. 7 illustrates information handling system 701 which is a simplified example of a computer system capable of performing the server and client operations described herein. Computer system 701 includes processor 700 which is coupled to host bus 705. A level two (L2) cache memory 710 is also coupled to the host bus 705. Host-to-PCI bridge 715 is coupled to main memory 720, includes cache memory and main memory control functions, and provides bus control to handle transfers among PCI bus 725, processor 700, L2 cache 710, main memory 720, and host bus 705. PCI bus 725 provides an interface for a variety of devices including, for example, LAN card 730. PCI-to-ISA bridge 735 provides bus control to handle transfers between PCI bus 725 and ISA bus 740, universal serial bus (USB) functionality 745, IDE device functionality 750, power management functionality 755, and can include other functional elements not shown, such as a real-time clock (RTC), DMA control, interrupt support, and system management bus support. Peripheral devices and input/output (I/O) devices can be attached to various interfaces 760 (e.g., parallel interface 762, serial interface 764, infrared (IR) interface 766, keyboard interface 768, mouse interface 770, and fixed disk (HDD) 772) coupled to ISA bus 740. Alternatively, many I/O devices can be accommodated by a super I/O controller (not shown) attached to ISA bus 740.

BIOS 780 is coupled to ISA bus 740, and incorporates the necessary processor executable code for a variety of low-level system functions and system boot functions. BIOS 780 can be stored in any computer readable medium, including magnetic storage media, optical storage media, flash memory, random access memory, read only memory, and communications media conveying signals encoding the instructions (e.g., signals from a network). In order to attach computer system 701 to another computer system to copy files over a network, LAN card 730 is coupled to PCI bus 725 and to PCI-to-ISA bridge 735. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing the invention described herein, this computer system is simply one example of a computer system. Those skilled in the art will appreciate that many other computer system designs are capable of performing the invention described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of displaying graphical images, said method comprising:
retrieving a thumbtable matrix, the thumbtable matrix including one or more thumbnails organized in a first matrix configuration; displaying the thumbtable matrix on a display window; displaying a first larger image corresponding to a first thumbnail on the display window concurrently with the displayed thumbnails; identifying a vertical scroll configuration; selecting a back scroll button; determining whether the thumbtable matrix is displaying a first thumbnail; and scrolling the thumbtable matrix in response to the determination.

2. The method as described in claim 1 further comprising:
requesting the thumbtable matrix and the first larger image from a server computer system via a computer network; and
receiving the thumbtable matrix and the first larger image from the server computer system.

3. The method as described in claim 1 further comprising:
identifying a horizontal scroll configuration;
selecting a next scroll button;
determining whether the thumbtable matrix is displaying a last thumbnail; and
scrolling the thumbtable matrix in response to the determination.

4. The method as described in claim 1 further comprising: receiving a selection corresponding to one of the displayed thumbnails; retrieving a second larger image corresponding to the selected thumbnail; and displaying the second larger image on the display window concurrently with the displayed thumbnails.

5. The method as described in claim 1 further comprising:
receiving a second matrix configuration selection; and
displaying the thumbtable matrix corresponding to the second matrix configuration selection.

6. The method as described in claim 1 wherein at least one of the thumbnails are selected from the group consisting of a digital picture, a video clip, and a live video feed.

7. An information handling system comprising:
one or more processors; a memory accessible by the processors; one or more nonvolatile storage devices accessible by the processors; a graphical image display tool, the graphical image display tool including: means for retrieving a thumbtable matrix, the thumbtable matrix including one or more thumbnails organized in a first matrix configuration; means for displaying the thumbtable matrix on a display window; means for displaying a first larger image corresponding to a first thumbnail on the display window concurrently with the displayed thumbnails; means for identifying a vertical scroll configuration; means for selecting a back scroll button; means for determining whether the thumbtable matrix is means for displaying a first thumbnail; and means for scrolling the thumbtable matrix in response to the determination.

8. The information handling system as described in claim 7 further comprising:
means for requesting the thumbtable matrix and the first larger image from a server computer system via a computer network; and
means for receiving the thumbtable matrix and the first larger image from the server computer system.

9. The information handling system as described in claim 7 further comprising:
means for receiving a selection corresponding to one of the displayed thumbnails;
means for retrieving a second larger image corresponding to the selected thumbnail; and
means for displaying the second larger image on the display window concurrently with the displayed thumbnails.

10. The information handling system as described in claim 7 further comprising:
means for receiving a second matrix configuration selection; and
means for displaying the thumbtable matrix corresponding to the second matrix configuration selection.

11. A computer program product stored in a computer operable media for displaying graphical images, said computer program product comprising: means for retrieving a thumbtable matrix, the thumbtable matrix including one or more thumbnails organized in a first matrix configuration;
means for displaying the thumbtable matrix on a display window;
comprising: means for retrieving a thumbtable matrix, the thumbtable matrix including one or more thumbnails organized in a first matrix configuration;
means for displaying the thumbtable matrix on a display window;
means for displaying a first larger image corresponding to a first thumbnail on the display window concurrently with the displayed thumbnails; means for identifying a vertical scroll configuration; means for selecting a back scroll button; means for determining whether the thumbtable matrix is displaying a first thumbnail; and means for scrolling the thumbtable matrix in response to the determination.

12. The computer program product as described in claim 11 further comprising:
means for requesting the thumbtable matrix and the first larger image from a server computer system via a computer network; and
means for receiving the thumbtable matrix and the first larger image from the server computer system.

13. The computer program product as described in claim 11 further comprising:
means for identifying a horizontal scroll configuration;
means for selecting a next scroll button;
means for determining whether the thumbtable matrix is displaying a last thumbnail; and
means for scrolling the thumbtable matrix in response to the determination.

14. The computer program product as described in claim 11 further comprising: means for receiving a selection corresponding to one of the displayed thumbnails;
means for retrieving a second larger image corresponding to the selected thumbnail; and
means for displaying the second larger image on the display window concurrently with the displayed thumbnails.

15. The computer program product as described in claim 11 further comprising:
means for receiving a second matrix configuration selection; and
means for displaying the thumbtable matrix corresponding to the second matrix configuration selection.

16. The computer program product as described in claim 11 wherein at least one of the thumbnails are selected from the group consisting of a digital picture, a video clip, and a live video feed.

17. A method of displaying graphical images on a display device attached to a client computer, said method comprising:
requesting a thumbtable matrix and a first larger image from a server computer system via a computer network;
receiving, from the server, the thumbtable matrix and the first larger image, wherein the thumbtable matrix includes one or more thumbnails organized in a first matrix configuration, wherein the first larger image corresponds to one of the thumbnails and wherein at least one of the thumbnails is selected from the group consisting of a digital picture, a video clip, and a live video feed;
displaying, on the display device, the thumbtable matrix concurrently with the first larger image in a display window;
identifying a horizontal scroll configuration for the display window;
selecting a next scroll button;
determining whether the thumbtable matrix is displaying a last thumbnail;
scrolling the thumbtable matrix in response to the determination;
identifying a vertical scroll configuration;
selecting a back scroll button;
determining whether the thumbtable matrix is displaying a first thumbnail;
scrolling the thumbtable matrix in response to the determination;
receiving a selection corresponding to one of the displayed thumbnails;
retrieving a second larger image corresponding to the selected thumbnail;
displaying the second larger image on the display window concurrently with the displayed thumbnails;
receiving a second matrix configuration selection from a user;
retrieving the second matrix configuration; and
displaying the thumbtable matrix corresponding to the second matrix configuration selection, wherein the appearance of the displayed thumbtable matrix using the second matrix configuration is different from the appearance of the displayed thumbtable matrix using the first matrix configuration.

* * * * *

UNITED STATES PATENT AND TRADEMARK OFFICE
CERTIFICATE OF CORRECTION

PATENT NO. : 6,961,908 B2  Page 1 of 1
APPLICATION NO. : 10/004923
DATED : November 1, 2005
INVENTOR(S) : Phillips It is certified that error appears in the above-identified patent and that said Letters Patent is hereby corrected as shown below:

Claim 7, column 9, line 7, please delete "means for"

Claim 11, column 9, line 34, please delete "means for retrieving a"

Claim 11, column 9, line 35, please delete "thumbtable matrix, the thumbtable matrix including one or"

Claim 11, column 9, line 36, please delete "more thumbnails organized in a first matrix configuration;"

Claim 11, column 9, line 37, please delete "means for displaying the thumbtable matrix on a display"

Claim 11, column 9, line 38, please delete "window;"

Claim 11, column 9, line 39, please delete "comprising:"

Signed and Sealed this

Twenty-eighth Day of October, 2008

JON W. DUDAS
*Director of the United States Patent and Trademark Office*